United States Patent
Muck

(10) Patent No.: US 9,131,777 B2
(45) Date of Patent: Sep. 15, 2015

(54) VARIABLE LUMBAR SUPPORT ASSEMBLY

(71) Applicant: Toyota Motor Engineering & Manufacturing North America, Inc., Erlanger, KY (US)

(72) Inventor: Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 32 days.

(21) Appl. No.: 14/063,803

(22) Filed: Oct. 25, 2013

(65) Prior Publication Data

US 2015/0115679 A1    Apr. 30, 2015

(51) Int. Cl.
   *A47C 7/46*    (2006.01)

(52) U.S. Cl.
   CPC .................................. *A47C 7/462* (2013.01)

(58) Field of Classification Search
   CPC ............. B60N 2/66; A47C 7/46; A47C 7/462
   See application file for complete search history.

(56) References Cited

U.S. PATENT DOCUMENTS

| | | |
|---|---|---|
| 4,313,637 A | 2/1982 | Barley |
| 4,541,670 A * | 9/1985 | Morgenstern et al. ...... 297/284.7 |
| 4,915,448 A * | 4/1990 | Morgenstern ............... 297/284.7 |
| 4,981,325 A | 1/1991 | Zacharkow |
| 5,335,965 A * | 8/1994 | Sessini ........................ 297/284.4 |
| 5,567,011 A * | 10/1996 | Sessini ........................ 297/284.7 |
| 6,000,757 A | 12/1999 | Sovis |
| 6,039,705 A * | 3/2000 | Wu ................................. 601/99 |
| 6,387,063 B1 * | 5/2002 | Elnar ............................. 601/99 |
| 7,303,231 B2 | 12/2007 | Frank |
| 8,360,523 B2 | 1/2013 | Maierhofer et al. |

FOREIGN PATENT DOCUMENTS

| | | |
|---|---|---|
| CN | 103182974 A | 7/2013 |
| EP | 0233974 A1 | 9/1987 |
| EP | 1082037 | 3/2001 |
| EP | 2301796 A2 | 3/2011 |
| JP | 2006075257 A | 3/2006 |
| WO | 2010099574 A1 | 9/2010 |

OTHER PUBLICATIONS

U.S. Appl. No. 13/755,732, filed Jan. 31, 2013.

* cited by examiner

*Primary Examiner* — Philip Gabler
(74) *Attorney, Agent, or Firm* — Gifford, Krass, Sprinkle, Anderson & Citkowski, P.C.

(57) ABSTRACT

A variable lumbar support including a frame and a support extending between an upper end and a lower end wherein the support bracket includes a first longitudinal direction. A pad having a first surface is provided within the assembly. The first surface of the pad contacts the lumbar portion of the seat assembly. The pad is positioned between the lumbar portion and the seat back cushion. Upon a sliding movement of the lumbar member along the support while in contact with the pad, a curved surface of the pad is displaced in the first longitudinal direction and a second direction normal to the first direction. As the lumbar member contacts the curved areas of the pad, the foam is displaced and pushed towards (a bulge) the seat back cushion so that the user of the vehicle seat feels a fore-and-aft movement of the lumbar member.

17 Claims, 5 Drawing Sheets

VARIABLE LUMBAR SUPPORT ASSEMBLY

FIELD OF THE INVENTION

The present invention relates to a lumbar support assembly for a seat back of a vehicle seat. More particularly, the present invention relates to a lumbar support assembly structured to allow for both vertical displacement and fore-and-aft displacement of a lumbar member using only a single actuator.

BACKGROUND OF THE INVENTION

Most modern automotive vehicles include seat assemblies having a lumbar support. The lumbar support allows a driver to actuate a mechanism to move a lumbar member in the fore and aft direction (i.e. the vehicle longitudinal direction) to provide support to the occupant's lumbar region. The lumbar support relieves lower back stress and provides an increased comfort level while in the vehicle. In order to accommodate occupants of varying sizes it has been known to provide the lumbar support that is displaceable in the vertical direction as well as the fore and aft direction, so as to place the displaced lumbar member at a proper vertical orientation selected by the occupant. However, these previously known systems have a number of disadvantages.

One such disadvantage is the increased cost of the previously known four-way moveable lumbar support assemblies. Specifically, the previously known lumbar support assemblies require an actuator to move the lumbar member in the fore and aft longitudinal direction and a second actuator to move the lumbar member in the vertical direction. The inclusion of two separate actuators, such as electronically controlled motors or hand-operated mechanisms increases the overall cost of the seat assembly. Further, the use of dual actuators increases the bulkiness of the lumbar support assembly requiring additional assembly time which increases both production and labor costs.

Other previously known configurations require use of a curved track to move the lumbar member in a fore and aft manner. This requires a specialized track thereby adding additional parts and weight.

Thus, there exists a need for an improved lumbar support assembly having a configured solution source to allow both the vertical displacement and fore and aft displacement of a lumbar member without increasing weight and cost of the vehicle seat assembly.

SUMMARY OF THE INVENTION

The present invention provides an improved variable lumbar support assembly which overcomes the above mentioned disadvantages of the previously known lumbar assemblies. The seat assembly includes a seat back cushion. The assembly includes a support bracket having an upper end and an opposite lower end. A support extends between the upper end and the lower end wherein the support bracket includes a first longitudinal direction. A pad having a first variable surface is provided within the assembly. The first surface of the pad contacts the lumbar portion of the seat assembly. The pad is positioned between the lumbar portion and the seat back cushion. A lumbar member is slidingly attached to the support of the support bracket.

Upon a sliding movement of the lumbar member along the support while in contact with the pad, the pad is displaced in the first longitudinal direction and a second direction normal to the first direction. The pad is made of a foam or foam like material and includes a curved surface where the lumbar member contacts the pad. As the lumbar member contacts the curved areas of the variable pad, the foam is displaced and pushed towards the seat back cushion so that the user of the vehicle seat feels a fore-and-aft movement of the lumbar member. The curved surface of the pad negates the requirement of having a curved track such as in previous designs to save space, cost and weight. No additional parts are required other than the modification of the already existing pad to make it a variable pad.

BRIEF DESCRIPTION OF THE DRAWINGS

A better understanding of the present invention will be had upon reference to the following detailed description when read in conjunction with the accompanying drawings, wherein like reference numerals are in reference to the like parts throughout the several views and in which.

DETAILED DESCRIPTION OF THE INVENTION

The present invention provides for a seat assembly having a variable lumbar support assembly and a seat back assembly having the variable lumbar support assembly that provides both vertical displacement and fore-and-aft displacement of a lumbar member. By providing the lumbar support assembly with a variable pad having a curved central portion and a lumbar member that is slidingly attached to a track to minimize parts where the lumbar member slides along the curved portion of the variable pad to provide both a vertical and fore-and-aft displacement, the seat assembly overcomes the disadvantages of previously known lumbar support systems.

Figure 1:
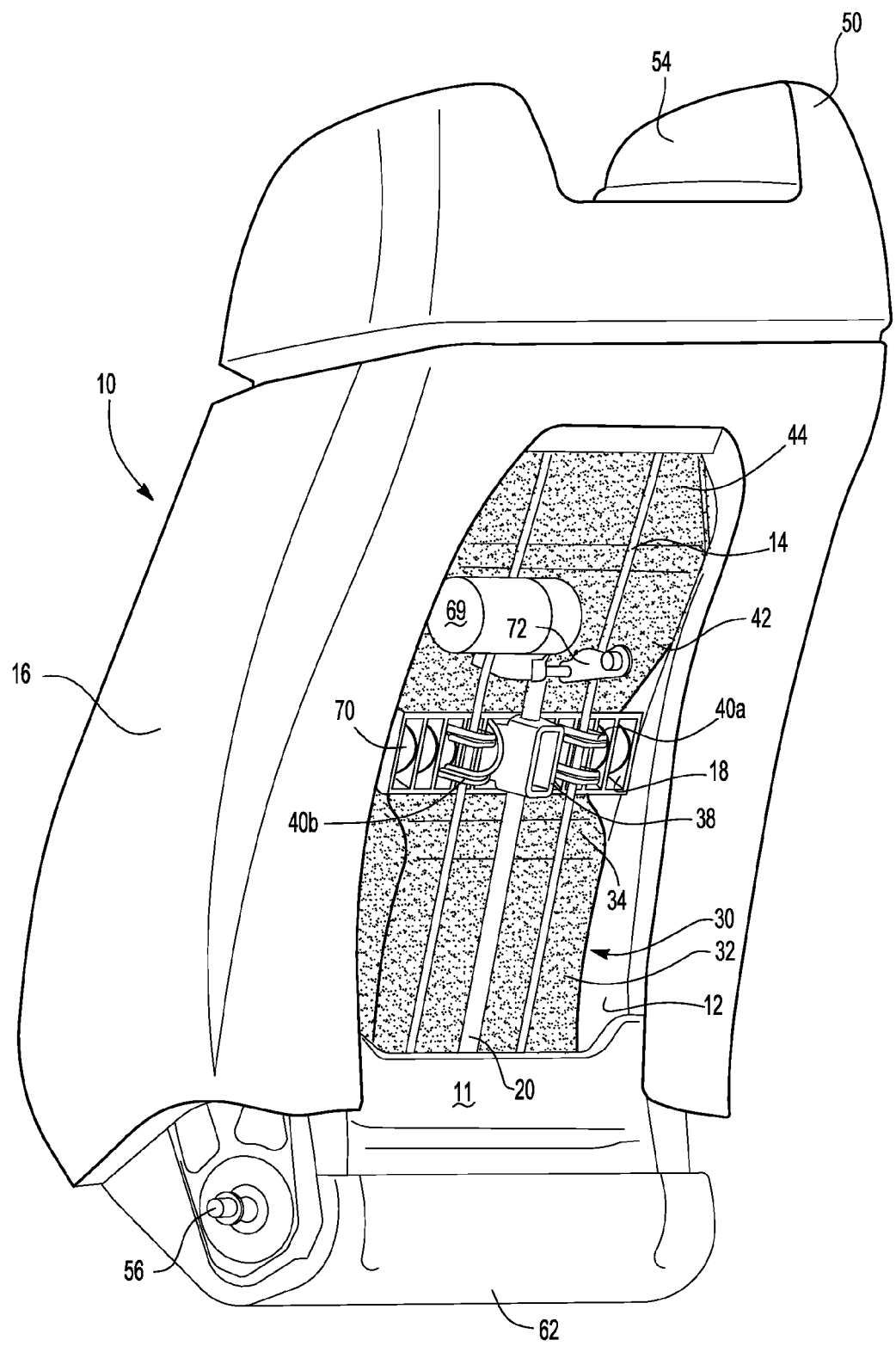
FIG. 1 is a perspective rear view of the seat assembly of the present invention.
Figure 4:
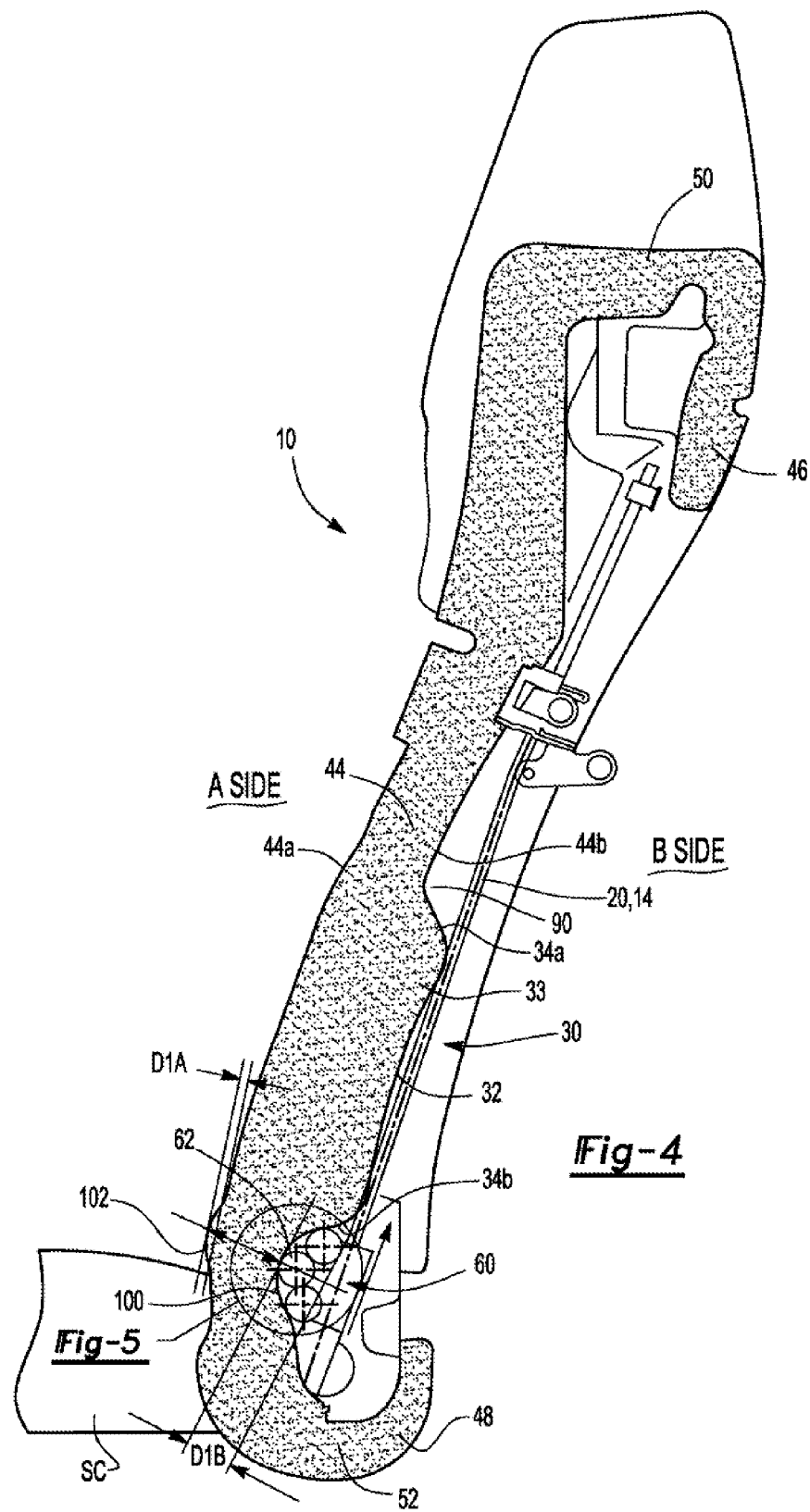
FIG. 4 is a cross sectional view of the seat assembly when the seat assembly is at minimal displacement.

Specifically, movement of the lumbar member along the curved portion of the variable pad provides both vertical and fore-and-aft displacement of the lumbar member without the need of additional cost and weight of a second actuator and without the additional cost and weight of a separate track. A seat back assembly 10 of the present invention, as illustrated in FIG. 1, includes a seat back frame 12 including a mounting wire 14, and a lumbar support assembly 18. The seat back assembly 10 further includes an occupant seat cushion SC, as shown in FIG. 4. The lumbar support assembly 18 is secured to the mounting wire 14 and to a push rod assembly 20. A pad 44 covers the seat back frame 12 to provide a cushion for the seat back assembly 10 as well as lumbar support and perceived movement. The pad 44 may include a cover 53 such as fabric, leather, leather like, vinyl, etc. cover to provide comfort to the user.

The seat back assembly 10 includes an upper end 50 and a lower end 52. The upper end 50 includes a headrest cutout portion 54 operable to accept a headrest. The lower end 52 of the seat back assembly 10 includes a pivot assembly 56 operable to attach to a seat cushion portion of the entire seat assembly.

The seat back assembly 10 may optionally include a secondary seat back cushion 16 over the pad 44. The seat back cushion 16 extends over the pad 44 and wraps around the seat back frame 12. The seat back cushion 16 may further include a cover such as fabric, leather, leather like, vinyl, etc. cover to provide comfort to the user. The seat back cushion 16 further may fully cover the lumbar support and actuators.

FIG. 1 illustrates the seat back portion having a cutout portion to easily illustrate the lumbar portion and lumbar movement.

The seat back assembly 10 further includes the lumbar support assembly 18. The lumbar support assembly 18 includes a lumbar support assembly 60 slidingly attached to the push rod assembly 20 and the mounting wire 14. The lumbar support assembly 60 is operable to slide upwards 80 and downwards 82 along the push rod assembly 20 and on the mounting wire 14. The mounting wire 14 further includes a lower base 15 for securing the mounting wire to the seat back frame 12. The mounting wire 14 further includes upper free ends and connected portions 13 for securing the mounting wire 14.

Figure 3:
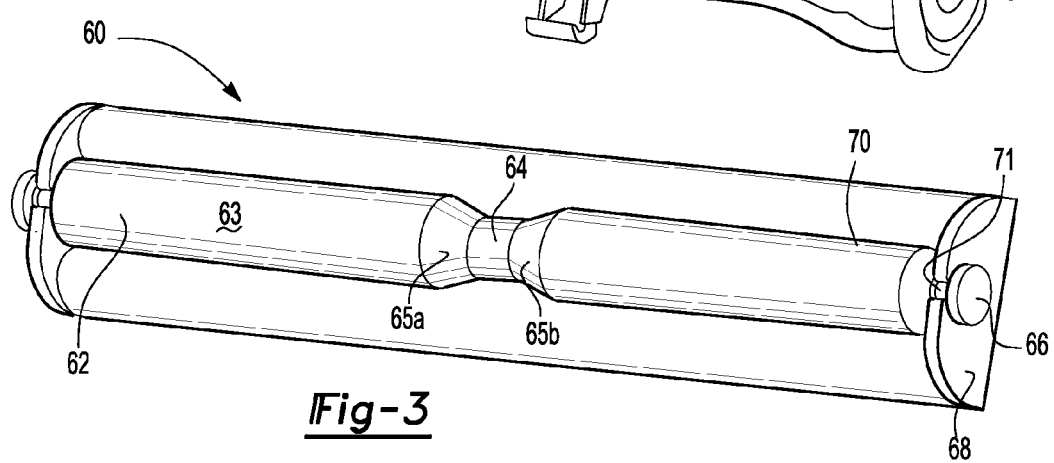
FIG. 3 is a perspective view of the lumbar member of the present invention.

As shown in FIG. 3, the lumbar support assembly 60 includes a roller 62. The roller 62 has a smooth outer surface 63 operable to connect to the foam of the pad 44. The roller 62 includes a center portion 64 having tapered or angled portions 65a, 65b. The lumbar support assembly may optionally include a plurality of rollers. The roller 62 is mounted within a housing 70. The housing 70 is connected directly to the push rod assembly 20, the mounting wires 14, or other suitable support member for moving the lumbar support assembly 60. The roller 62 extends between two bracket portions 68. The bracket portions 68 are spaced apart by the roller 62 and further attached to the housing 70. The brackets 68 include notches 71 operable to hold the end portion 66 of the roller 62. The notches 71 allow the roller 62 to rotate and roll within the housing 70.

The lumbar support assembly 60 attaches to the push rod 20 at a connector 38. The connector 38 includes an aperture operable to accept the push rod 20. The connector 38 allows the lumbar support assembly 60 to slide along the push rod 20.

Connector portions 40a, 40b are positioned on a back side of the housing 70 of the lumbar support assembly 60. The connector portions 40a, 40b are operable to accept the mounting wire 14. The connector portions 40a, 40b include an aperture operable to hold and slidingly accept the mounting wire 14.

The pad 44 is made of a foam or foam like material. The pad 44 includes an upper end 50 and a lower end 52. The upper end 50 includes a curved portion 46 operable to wrap around the seat back frame 12 and operable to be secured into place. The lower end 52 includes a similar wrapped portion 48 operable to connect to a lower end of the seat back frame 12. The pad 44 includes a front surface 44a and a rear surface 44b. The front surface 44a is generally planar or slightly arcuate. The first surface 44a abuts the seat back cushion portion 16. The variable pad further includes the second surface 44b. The second surface 44b includes a curved portion 30 operable to interact with the lumbar support assembly 60. The curved portion 30, by way of example in the present embodiment, includes a flattened portion 32 positioned between a pair of sloped portions 34a, 34b. The flattened portion 32 is generally planar or slightly arcuate. The sloped portions 34a, 34b slope downwards to other flattened portions or slightly curved portions.

In alternative embodiments, the curved portion of the pad 44 includes various patterns and shapes. By way of example, the curved portion of the pad 44 is waved or includes various geometric shapes such as sharp edges and rectangles. The pad 44 may include bumps or various textures for displacement of the variable pad (see FIGS. 6-12).

A curved portion 33 of the pad 44 is designed to contact the lumbar support 60 to provide significant displacement of the pad 44 to create a displacement to the A side of the seat assembly 10. The curved portion 33 has a thickness greater than the thickness of the remainder of the pad 44. The A side, as shown in FIG. 4, is the side of the seat assembly 10 where the user rests its back. Further, as shown in FIG. 4, the B side of the seat assembly is the rear of the seat assembly where the lumbar support and other actuators/motors are present. The displacement created by the lumbar support assembly 60 and the pad 44 having the curved portion 33 displaces the foam (pad) 44 to the A side of the seat assembly.

As shown in FIG. 4, the lumbar support assembly 60 causes minimal displacement of the foam to the A side of the seat assembly when the lumbar support is at a lowered rest position. The lowered rest position is shown in FIG. 4. Minimal displacement on the A side of the seat assembly is illustrated at displacement D1A. This displacement D1A is a predetermined displacement forming a first bulge. This predetermined displacement D1A ranges between 0-10 centimeters.

In the present embodiment, displacement D1A is nonexistent to minimal where minimal ranges between 1 millimeter to 10 centimeters. The displacement D1B is illustrated where the lumbar support assembly 60 pushes into the pad 44. As illustrated in FIG. 4, the displacement D1A is smaller than the displacement of D1B. This occurs due to compression of the foam within the pad 44.

Figure 5:
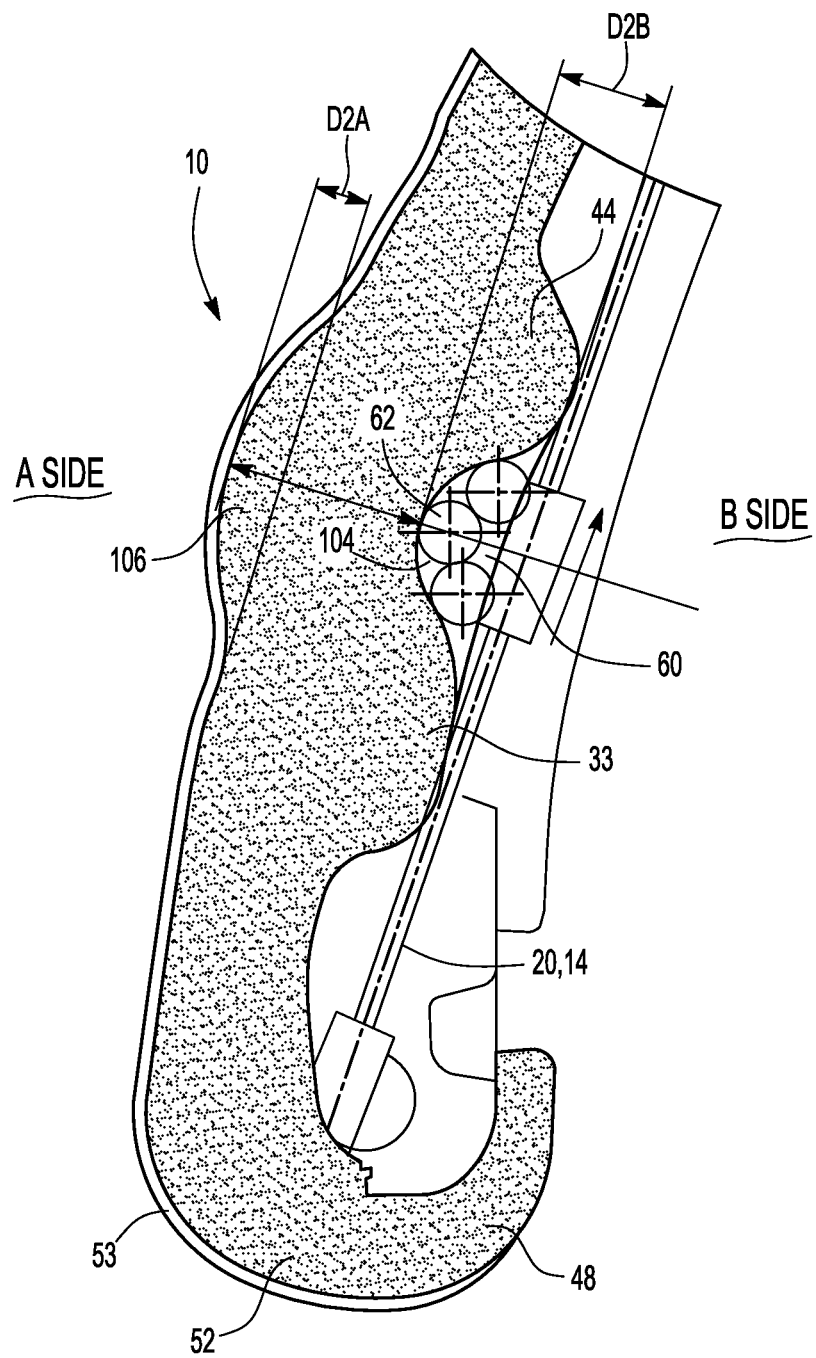
FIG. 5 illustrates a cross sectional view of the seat assembly when the seat assembly is at maximum displacement.

FIG. 5 illustrates a maximum displacement of the pad 44. This maximum displacement of the pad 44 occurs when the lumbar support assembly 60 is in full contact with the curved portion 33 of the pad 44. The maximum displacement as illustrated in FIG. 5 creates a strong fore-and-aft feeling to the user of the vehicle seat.

The inclusion of the curved portion 33 of the pad 44 gives the impression to the user that the lumbar support assembly 60 is moving in a fore direction when the lumbar support member is in contact with the curved portion 33 of the pad 44.

FIG. 5 illustrates the maximum displacement D2A at the A side of the seat assembly 10. The displacement D2A is a predetermined thickness of 1-30 centimeters. Positioning of the lumbar support assembly 60 as shown in FIG. 5 gives the user the greatest sense of fore movement of the lumbar support assembly 60. The maximum displacement D2A as illustrated in FIG. 5 ranges between 1 centimeter to 30 centimeters of generally horizontal or slightly angled fore movement.

The maximum displacement, or other displacement, is moved in a direction normal to the movement of the lumbar support assembly 60. The displacement D2B on the B side of the seat assembly 10 illustrates the displacement of the foam of the pad 44 as the lumbar support assembly 60 is in contact with the curved portion 33 of the pad 44. The displacement D2B is generally larger than the displacement D2A due to compression of the foam within the pad 44.

Figure 2:
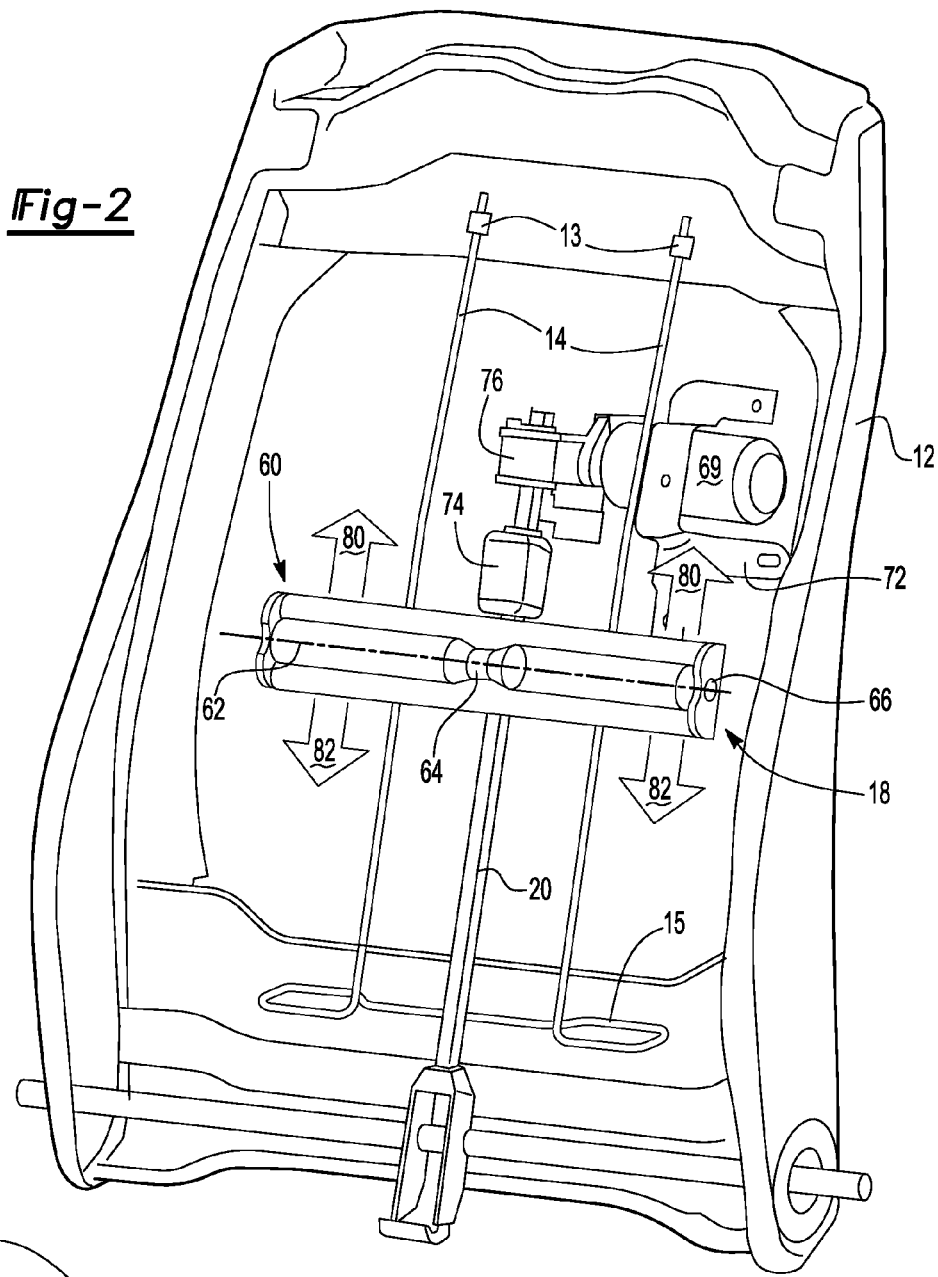
FIG. 2 is a perspective front view of the seat assembly of the present invention.

FIGS. 1 and 2 illustrate the actuator 69 of the present invention. The actuator 69 is operable to move the lumbar support assembly 60 along the push rod assembly 20 and the mounting wires 14 of the present invention. The actuator 69 is in the form of an electronically controlled motor. The actuator includes a connector bracket 72 operable to mount the actuator 69 to the seat back frame 12. The actuator 69 is connected to the control portion 74 operable to control the push rod 20 of the present invention. The actuator 69 is operable to move the lumbar support assembly 60 along the push rod 20 by means of a screw assembly, a reel and wire assembly, or other actuator operable to move the lumbar support assembly 60 along the push rod 20 or the support rails or wires 14.

Activation of the actuator 69 may be done by a control switch (not shown) controlled by the user. This control switch may be located on the side of the vehicle seat or located on the seat cushion SC portion of the seat assembly.

The control switch may be in communication with an electronic control unit (ECU) (not shown). The ECU is in further communication with the actuator to relay information from the switch to the actuator. The ECU tells the actuator when to move the lumbar member when the user presses the control switch located on the side of the vehicle seat.

Alternatively, the actuation mechanism may include a reel which rotates about a central axis to wind a connection member about a reel. The connection member is in the form of a pair of broken cables having housings.

Activation of the actuation mechanism, by a control switch (not shown), rotates the reel which pulls the end of the connection member thereby sliding the lumbar member upwards. The winding of the connection member unwinds a portion of the connection member thereby providing the slack for the lumbar member to be pulled by the pulling of the connection element. As such, the lumbar member is vertically displaced in an upwards direction.

In an alternative configuration, the seatback assembly 10 is provided with an actuation mechanism in the form of a hand or manual operated mechanism using a knob. The actuation mechanism includes reel, as described above, and a handle or knob. Actuation of the handle operates the actuation mechanism in a similar manner as actuation of the electronically controlled motor of the actuation mechanism. The actuation mechanism of a hand-operated nature would include a handle operable to move the support assembly 60 along the wires 14.

The configuration of the lumbar support assembly 18 provides the user with a range of vertical displacement and fore-and-aft displacement of the lumbar support assembly 60 between a lower off position as illustrated in FIG. 4 and an upper off position when the lumbar support portion is located at a position 90 as located on FIG. 4. Between the lower off position as shown in FIG. 4 and the upper off position, the occupant is provided with a selectable fore-and-aft displacement of the lumbar assembly 60 as the lumbar assembly 60 travels up towards an upper end 50 of the seat assembly 10. The lumbar support assembly 60 is provided at a central location when it contacts the curved portion 33 of the pad 44 which displaces the pad 44 and the seat cushion 16 towards the user thereby providing the user with both vertical displacement of the lumbar support member and fore-and-aft displacement of the lumbar support assembly 60.

The assembly is further defined by a first position and a second position. The first position is illustrated in FIG. 4 where there is a minimal first bulge (or displacement) D1A. This first position may also form no bulge (i.e. when the lumbar assembly 60 is not in contact with or only minimally in contact with the pad. A second position is defined when the lumbar assembly 60 is in contact with the curved surface. When the lumbar member (or lumbar assembly) is in contact with the curved portion, the pad is displaced at a displacement D2A to form a second bulge. This second bulge is larger as compared to the first bulge. In other terms, D2A (of FIG. 5) is larger than D1A. This bulge or displacement 106 is felt by the driver and perceived to be a fore movement of the lumbar assembly. The bulge moves upwards (and downwards) up the back of the driver (or other occupant) to give the feeling for a fore/aft movement as well as longitudinal displacement of the lumbar assembly.

The assembly is further defined by a bottom first position (as shown by the support assembly in FIG. 4) and a second support position (as shown in FIG. 5). The bottom first positioned is defined where the lumbar assembly is not in contact with the curved portion to form a first bulge or no bulge. The second support position is defined where the lumbar assembly is in contact with the curved portion to form a second bulge larger than the first bulge. The bulge moves upwardly and downwardly corresponding to the movement of the support assembly and roller.

Figures 6, 7, 8, 9:
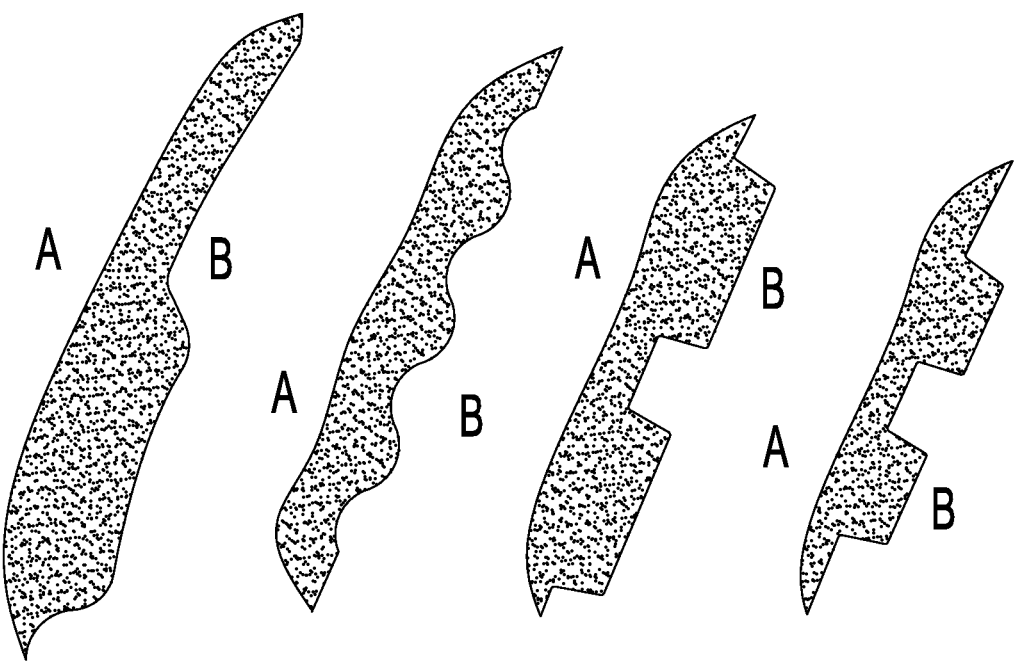
FIG. 6 illustrates a profile view of the pad of the present invention having a generally flat (slightly curved) top portion with sloped side surfaces.
FIG. 7 illustrates a profile view of an alternative embodiment of the pad of the present invention having a waved configuration.
FIG. 8 illustrates a profile view of an alternative embodiment of the pad of the present invention having a rectangular surface.
FIG. 9 illustrates a profile view of an alternative embodiment of the pad of the present invention having a smaller rectangular surface.
Figures 10, 11, 12:
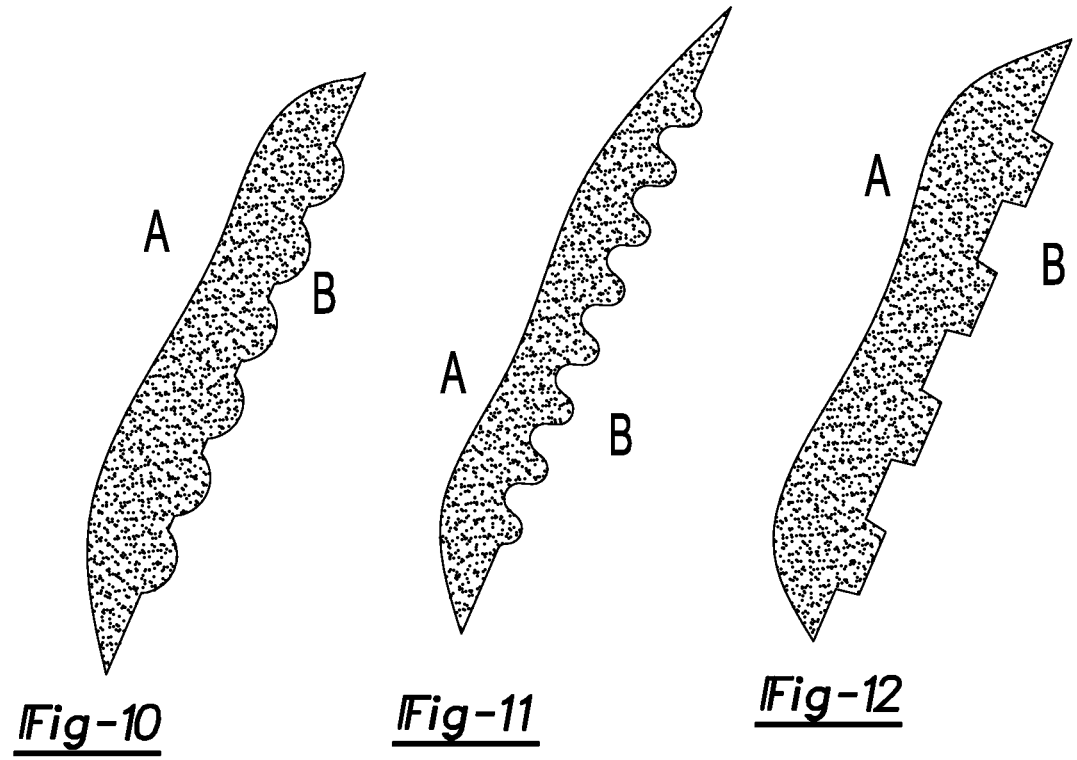
FIG. 10 illustrates a profile view of an alternative embodiment of the pad of the present invention having a plurality of curved surfaces on the pad.
FIG. 11 illustrates a profile view of an alternative embodiment of the pad of the present invention having a plurality of small curved surfaces or bumps.
FIG. 12 illustrates a profile view of an alternative embodiment of the pad of the present invention having a plurality of shallow rectangular surfaces.

FIGS. 6-12 illustrate the various embodiments of the shape of the pad of the present invention. These embodiments each have an A side and a B side where the A side is the side where the driver is and the B side is where the lumbar member is. FIG. 6 illustrates a profile view of the pad of the present invention having a generally flat (slightly curved) top portion with sloped side surfaces. FIG. 7 illustrates a profile view of an alternative embodiment of the pad of the present invention having a waved configuration. FIG. 8 illustrates a profile view of an alternative embodiment of the pad of the present invention having a rectangular surface. FIG. 9 illustrates a profile view of an alternative embodiment of the pad of the present invention having a smaller rectangular surface. FIG. 10 illustrates a profile view of an alternative embodiment of the pad of the present invention having a plurality of curved surfaces on the pad. FIG. 11 illustrates a profile view of an alternative embodiment of the pad of the present invention having a plurality of small curved surfaces or bumps. FIG. 12 illustrates a profile view of an alternative embodiment of the pad of the present invention having a plurality of shallow rectangular surfaces. Each of these figures includes an A side and a B side where the A side is the user side and where the lumbar support is on the B side.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

It is claimed:
1. A variable lumbar support assembly for a seat assembly, the lumbar support comprising:
   a frame having an upper end and an opposite lower end, a support extending between the upper and the lower end, the support connected to the frame;

a pad having a first surface and a second surface, the first surface of the pad contacting a lumbar assembly, the first surface of the pad having an integrally formed protruding portion;

the lumbar assembly slidingly attached to the support of the frame, upon sliding movement of the lumbar assembly along the support while in contact with the pad, the pad is displaced to form a bulge on the second surface when the lumbar assembly is in contact with the protruding portion of the first surface, the bulge moving upwardly and downwardly corresponding to the movement of the lumbar assembly.

2. The variable lumbar support assembly of claim 1 wherein the support is a push rod.

3. The variable lumbar support assembly of claim 1 wherein the support is a mounting wire.

4. The variable lumbar support assembly of claim 1 wherein the integrally formed protruding portion of the first surface of the pad is centrally located on the pad.

5. The variable lumbar support of claim 1 wherein the integrally formed protruding portion includes a flattened portion extending between a pair of sloped portions.

6. The variable lumbar support assembly of claim 1 wherein the integrally formed protruding portion includes a slightly arcuate portion extending between a pair of sloped portions.

7. The variable lumbar support assembly of claim 1 wherein the lumbar assembly is an elongated member.

8. The variable lumbar support assembly of claim 1 wherein the lumbar assembly includes at least one roller.

9. The variable lumbar support assembly of claim 8 wherein the at least one roller of the lumbar assembly includes a centered tapered portion.

10. The variable lumbar support assembly of claim 1 wherein an actuator moves a lumbar portion along the support.

11. The variable lumbar support assembly of claim 10 wherein the actuator is a motor.

12. The variable lumbar support assembly of claim 10 wherein the actuator is manual manipulation of a knob.

13. The variable lumbar support assembly of claim 10 wherein an electronic control until controls movement of the lumbar assembly.

14. The variable lumbar support assembly of claim 13 wherein a user operated control switch is in communication with the electronic control unit to control movement of the lumbar assembly.

15. The variable lumbar support assembly of claim 1 is further defined by a bottom first position and a second support position.

16. The variable lumbar support assembly of claim 15 wherein the bottom first positioned is defined where the lumbar assembly is not in contact with the integrally formed protruding portion to form a first bulge or no bulge.

17. The variable lumbar support assembly of claim 15 wherein the second support position is defined where the lumbar assembly is in contact with the integrally formed protruding portion to form a second bulge larger than the first bulge.

* * * * *

UNITED STATES PATENT AND TRADEMARK OFFICE
CERTIFICATE OF CORRECTION

| | | |
|---|---|---|
| PATENT NO. | : 9,131,777 B2 | Page 1 of 1 |
| APPLICATION NO. | : 14/063803 | |
| DATED | : September 15, 2015 | |
| INVENTOR(S) | : Todd Rupert Muck | |

It is certified that error appears in the above-identified patent and that said Letters Patent is hereby corrected as shown below:

In The Specification
In column 8, line 12, delete "electronic control until" and insert --electronic control unit--, therefor Signed and Sealed this
First Day of March, 2016

Michelle K. Lee
*Director of the United States Patent and Trademark Office*